United States Patent [19]

Inoue et al.

[11] 4,281,027

[45] Jul. 28, 1981

[54] PROCESS FOR MANUFACTURING COCOA POWDER

[75] Inventors: Mitsuyori Inoue, Chuoku Tokyoto; Akira Yamabe, Chibashi, both of Japan

[73] Assignee: Iwatani Sangyo Kabushiki Kaisha, Chuoku Tokyoto, Japan

[21] Appl. No.: 26,385

[22] Filed: Apr. 2, 1979

[30] Foreign Application Priority Data

Nov. 10, 1978 [JP] Japan .............................. 53/139014
Nov. 17, 1978 [JP] Japan .............................. 53/142573

[51] Int. Cl.³ .............................................. A23G 1/00
[52] U.S. Cl. ............................... 426/631; 426/429; 426/430; 426/444; 426/518; 426/524
[58] Field of Search ............. 426/631, 655, 385, 429, 426/430, 431, 444, 473, 524, 428, 384, 518; 241/DIG. 37, 23

[56] References Cited

U.S. PATENT DOCUMENTS

| | | | |
|---|---|---|---|
| 1,947,717 | 2/1934 | Kellogg et al. | 426/631 |
| 2,380,158 | 7/1945 | Durrenmatt et al. | 426/631 X |
| 2,512,663 | 6/1950 | Masurovsky | 426/430 |
| 2,583,697 | 1/1952 | Hendry et al. | 426/518 X |
| 2,954,293 | 9/1960 | Ruso ff | 426/429 X |
| 3,965,267 | 6/1976 | Davis | 426/524 X |
| 4,156,030 | 5/1979 | Eggen | 426/429 X |

FOREIGN PATENT DOCUMENTS

| | | | |
|---|---|---|---|
| 120623 | 12/1945 | Australia | 426/631 |
| 653240 | 5/1951 | United Kingdom | 426/631 |

*Primary Examiner*—Arthur L. Corbin
*Attorney, Agent, or Firm*—Schwartz, Jeffery, Schwaab, Mack, Blumenthal & Koch

[57] ABSTRACT

A process for manufacturing a cocoa powder, using shells of cocoa beans. The process includes extracting astringency from cocoa shells; submerging the shells in liquid nitrogen kept at not higher than −196 degrees C., thereby allowing instant freezing; and pulverizing the shells under a freezing gaseous atmosphere.

28 Claims, No Drawings

PROCESS FOR MANUFACTURING COCOA POWDER

BACKGROUND OF THE INVENTION

1. Field of the Invention

The present invention relates to a process for manufacturing cocoa powder from cocoa beans. More particularly, the present invention relates to a process for manufacturing cocoa powder mainly from shells of cocoa beans occupying 10% or more of the total weight, which shells have been so far discarded or used only for fertilizer and fodder.

2. Description of the Prior Art

The conventional process for manufacturing cocoa powder is, first of all, to remove shells and embryo buds after cocoa beans are winnowed, roasted and sieved, and then cocoa nibs occupying about 87% of the beans are produced. The nibs are mechanically ground to a cocoa mass, which after bring pressed, sets into a hard solid cocoa cake. The squeezed fat is preserved as a cocoa butter, which occupies 48% to 57% of the nibs. After being mechanically ground, the fat-reduced cocoa cake is pulverized into cocoa powder by means of a pulverizer called a cocoa mill. As commonly known, the cocoa butter is used in the manufacture of chocolate and in other confectionery.

However, this country has no native cocoa beans, but depends upon imports from abroad. For example, the import of cocoa beans in 1977 amounted to 242,970,000 Japanese Yen, from which it is calculated that the unit price was Japanese Yen 1,161 per kilogram. Nevertheless, it was 113.4% of the import of the preceding year.

As is well known, cocoa has become one of the most popular fancy foods in the world owing to its nutritious quality and its unique flavor and taste. On the other hand, the production of cocoa beans depends upon the climatic conditions of the year, and the price is unstable, fluctuating from year to year. In addition, the production of cocoa tends to decline due to many factors. For example, in Ghana, well known as a major producing country occupying 20% to 30% of the world production, its production of cocoa has been declining for the last two years due to the aging of cocoa trees, unstable weathers, lack of insecticides, and non-recruitment of aging experienced workers. After all, the total production in 1977 fell to 320,000 tons (20% decline compared with the preceding year). As a result, in order to overcome such difficulties of high price and absolute lack of supply, there has increased a demand for developing a substitute of cocoa beans and/or an extender.

In line with such worldwide demands, it is reported that Fritzsche, Dodge & Olcott Inc., of New York has succeeded in developing a suitable substitute of cocoa bean after having made chemical and physical researches to a cocoa essence (*The Manufacturing Confectionery*, April Issue, 1978).

According to its proposal, the substitute is made mainly from a whey of a relatively inexpensive, solid form. After it is specially treated, a natural or synthetic flavoring agent is added thereto. This mixture is added to a natural cocoa by 20% to 50%. When 50% of the natural cocoa is substituted by the mixture, it is reported that the production cost can be reduced by about 25%.

In contrast to such proposals for utilizing artificial substitutes, the present invention is directed to the ultilization of cocoa shells and embryo buds (hereinafter referred to jointly as shells) which have been previously considered almost as wastes. In other words, the present invention has for its object to provide an improved process for manufacturing cocoa powder with the additional use of cocoa shells for raw material.

SUMMARY OF THE INVENTION

According to the present invention, shells are separated from cocoa flesh after cocoa beans have been roasted, and the astringency inherent thereto is removed; the shells free from astringency are then frozen instantly by submerging same in liquid nitrogen kept at a temperature of not higher than −196 degrees C., and finally the frozen shells are pulverized into powder under a freezing gaseous atmosphere of not higher than −30 degrees C.

According to another aspect of the present invention, shells are separated from cocoa flesh after cocoa beans have been roasted, and are then frozen instantly by submerging same in liquid nitrogen kept at a temperature of not higher than −196 degrees C.; the frozen shells are pulverized into powder under a freezing gaseous atmosphere of not higher than −30 degrees C., and finally the pulverized shells are subjected to an astringency extraction treatment.

According to a further aspect of the present invention, unshelled cocoa beans are subjected to an astringency extraction treatment, and then to a fat extraction; the fat-reduced cocoa beans are frozen instantly by submerging same in liquid nitrogen kept at a temperature of not higher than −196 degrees C., and the frozen cocoa beans are pulverized into powder under a freezing gaseous atmosphere of not higher than −30 degrees C.

According to a still further aspect of the present invention, unshelled cocoa beans are subjected to fat extraction, and the fat reduced cocoa beans are frozen instantly by submerging same in liquid nitrogen kept at a temperature of not higher than −196 degrees C., and the frozen cocoa beans are pulverized into powder under a freezing gaseous atmosphere of not higher than −30 degrees C., and finally the pulverized cocoa beans are subjected to an astringency extraction treatment.

The astringency extraction treatment may comprise adding alcohol to the cocoa shells, blending the cocoa shells in the alcohol, and allowing the cocoa shells to mature at a temperature of 20 degrees C. to 80 degrees C. Alternatively, the astringency extraction may comprise adding a protein solution to the cocoa shells, blending the cocoa shells in the protein solution, and allowing the cocoa shells to mature at a temperature of 20 degrees C. to 80 degrees C.

Pulverization may take place under an inert atmosphere of nitrogen at a temperature of not higher than −50 degrees C. Pulverization may also take place under an atmosphere of carbon dioxide at a temperature of not higher than −30 degrees C.

The present invention will be better understood by the following examples:

EXAMPLE 1

1. Astringency Extracting Process 10 kg of roasted Ghana cocoa shells were placed in a closable container, and 100 g of A-grade alcohol was added thereto in a spray. Then the shells were stirred in the container until they were evenly blended with the alcohol. After being tightly closed, the container was kept under a thermal atmosphere of 20 degrees C. to 35 degrees C. for about 24 hours. It was found that the astringency and acridness contained in the shells had been removed without losing their flavor and taste of cocoa.

2. Freezing Process

The astringency extracted shells were submerged in liquid nitrogen kept at −196 degrees C., and were instantly frozen. It was then found that the tissues therein had become sufficiently softened to be broken into powder.

3. Pulverizing Process

The frozen shells were fed to a pulverizer by means of a screw feeder, wherein the pulverizer was installed under an inert atmosphere of nitrogen gas kept at not higher than −50 degrees C. The supplied shells were pulverized into powder under this atmosphere, wherein the rotor was driven at 6800 rpm. On average the grain size was 200 mesh, and the fat content was from 11.6% to 14%, which is an adequate range for use as cocoa powder.

The grain size of powder can be adjusted to the user's desired value by controlling the temperature at which the pulverization takes place, and/or the rotations of the rotor.

EXAMPLE 2

1. Astringency Extracting Process 10 kg of roasted Ghana cocoa shells including a small amount of embryo buds were placed in a container, and 200 g of a 50% solution of skimmed commercial milk was added thereto in a spray. Then, they were allowed to mature at a room temperature of 40 degrees C. to 60 degrees C. for about 15 hours. It was found that their astringency had been removed.

2. Freezing and Pulverizing Process

The shells treated in Process (1) were submerged in liquid nitrogen of −196 degrees C., and were instantly frozen. The frozen shells were fed to a pulverizer installed under an antiseptic atmosphere of carbon dioxide kept at −30 degrees C. The rotor was driven at about 6000 rpm. In this was 9.95 kg of cocoa powder of about 150 mesh was obtained.

EXAMPLE 3

1. Pretreatment for Astringency Extraction

To 10 kg of roasted Ghana cocoa shells, a mixture of 150 g of potassium carbonate solution and 30 g of A-grade alcohol was added in a spray. Then, the shells were stirred for about 10 minutes until the shells and the alcohol were evenly blended.

2. Freezing, Pulverizing, and Astringency-Extracting Process

The shells treated in Process (1) were submerged in liquid nitrogen of −196 degrees C., and were instantly frozen. The frozen shells were fed to a pulverizer installed under an antiseptic atmosphere of carbon dioxide kept at −30 degrees C. In this was 9.97 kg of cocoa powder of about 200 mesh was obtained. The powder obtained was immediately packed, and when it was unpacked after 24 hours, it was found that the astringency contained therein had been removed. Its brown color was lighter than that of the powder obtained in Example 2.

EXAMPLE 4

1. Freezing and Pulverizing Process 10 kg of roasted Ghana cocoa shells including a small amount of embryo buds were submerged in liquid nitrogen kept at −196 degrees C., and were allowed to freeze instantly. The frozen shells were fed to a pulverizer installed under an inert atmosphere of nitrogen gas kept at not higher than −50 degrees C., and were pulverized into powder under this atmosphere. In this way 9.96 kg of cocoa powder of 200 mesh was obtained.

2. Astringency Extracting Process

The 9.96 kg of cocoa powder obtained in Process (1) was placed in a container, and 80 g of A-grade alcohol was added thereto in a spray. Then the shells were stirred by means of a stirrer for about 10 minutes until the shells and the alcohol were evenly blended. At this stage, the container was closed, and was kept under a thermal atmosphere of 20 degrees C. to 65 degrees C. for about 24 hours. It was found that the astringency contained in the shells had been removed.

EXAMPLE 5

1. Astringency Extracting Process 10 kg of roasted Ghana cocoa beans with shells and embryo buds were placed in a closable container, and 100 g of A-grade alcohol was added thereto in a spray. Then they were stirred for about 5 minutes until the beans were evenly blended with the alcohol. After being tightly closed, the container was kept at a room temperature of 20 degrees C. to 30 degrees C. for about 24 hours. It was found that the astringency inherent to the shells had been removed during the maturing process.

The astringency extracted cocoa beans were subjected to fat extraction in a conventional manner, and cocoa butter and cocoa cake were separated.

2. Freezing Process

The cocoa cake obtained in Process (1) was submerged in liquid nitrogen kept at −196 degrees C., and was instantly frozen. It was found that the tissues in the cocoa cake had become softened sufficiently to be broken into powder.

3. Pulverizing Process

The frozen cocoa cake was fed by means of a screw feeder to a pulverizer, and was pulverized under an inert atmosphere of nitrogen gas kept at −50 degrees C. or less. It was found that the cocoa cake was almost instantly pulverized into powder. The room temperature was kept from −50 degrees C. to −60 degrees C., and the rotor of the pulverizer was driven at 6800 rpm. The grain size of the powder obtained was 200 mesh on average, and the amount was 7 kg.

EXAMPLE 6

1. Astringency Extracting Process 10 kg of roasted Ghana cocoa beans with shells and embryo buds were submerged in 200 g of a 50% solution of skimmed commercial milk for a few minutes. Then the beans were allowed to mature under a thermal atmosphere of 40 degrees C. to 60 degrees C. for about 15 hours. It was found that the astringency had been removed.

The astringency extracted beans were subjected to fat extraction in a conventional manner, and its fat content was reduced to about 20%. In this way, a cocoa cake was obtained.

2. Freezing and Pulverizing Process

The cocoa cake obtained in Process (1) was submerged in liquid nitrogen kept at −196 degrees C., and was instantly frozen. Then the frozen cake was fed by means of a screw feeder to a pulverizer, and was pulverized into powder under an antiseptic atmosphere of carbon dioxide kept at −30 degrees C., wherein the rotor was driven at 6000 rpm. In this way, 6.98 kg of cocoa powder of about 150 mesh was obtained.

EXAMPLE 7

1. Fat Extracting and Pulverizing Process 10 kg of roasted Ghana cocoa beans with shells and embryo buds were subjected to fat extraction in a conventional manner, and the cocoa cake obtained was frozen in liquid nitrogen kept at −196 degrees C., and was pulverized into powder under an inert atmosphere of nitrogen kept at −50 degrees C. or less.

2. Astringency Extracting Process 6.98 kg of cocoa powder of about 200 mesh obtained in Process (1) was placed in a container, and 80 g of A-grade alcohol was added thereto in a spray. Then they were stirred by means of a stirrer for about 10 minutes until the powder was evenly blended with the alcohol. After the container was tightly closed, the powder therein was allowed to mature at a room temperature of 65 degrees C. to 80 degrees C. for about 24 hours. It was found that the astringency had been removed during the maturing process.

It was found that the cocoa powder obtained in each example had the same flavor, taste and aroma as those of the cocoa powder produced by the conventional method, excluding shells and embryo buds. According to the analysis conducted by the Japan Food Analysis Center, the ingredients contained in a cocoa powder produced by the present invention are as follows:

water 2.0%; protein 15.8%; fat 13.8%; ash 6.9%; carbohydrate 61.5%.

The following are examples of cocoa-prepared confectionery containing a cocoa powder produced by the present invention:

A. A beverage (popular as a hot milk chocolate)
Cocoa powder of the present invention: 10 g
Cocoa butter: 1 g
Granular sugar: 10 g These ingredients were well blended with the addition of a small amount of milk, and 180 cc of hot milk was poured therein. It was found that the milk chocolate obtained had stronger flavor and aroma than the one prepared in accordance with the same proportion but by the use of a cocoa powder currently available in the market.

B. Cocoa concentrated extract 100 g of hot water of 60 degrees C. was poured into 100 g of cocoa powder (60 mesh), and they were stirred for about 30 minutes without allowing it to cool. After the solution was allowed to settle for 30 minutes, 60 cc of a cocoa essence was obtained from the deposits at the bottom.

150 cc of milk and a spoonful of sugar was added to 30 cc of the cocoa essence obtained to prepare a chocolate beverage. As an iced drink or a hot drink, they equally had the same taste as that of conventional chocolate drinks. In addition, it was found that they had a stronger flavor and aroma, and that they were less likely to have precipitations at the bottom.

C. Chocolate ice cream 100 g of ice cream currently available in the market and 7 g of cocoa powder were sufficiently blended, and the mixture was allowed to freeze into a solid chocolate ice cream. No difference in flavor and taste was perceived between this ice cream and conventional ice creams.

D. Cocoa-rich chocolate cake

The ingredients were as follows:
Butter: 120 g
Sugar: 12 g
Egg: 2 pieces
Flour: 150 g
Baking accelerator powder: 3 g
Sodium bicarbonate: a little
Vanilla essence: a little
Cocoa powder: 30 g
Cocoa butter: 3 g These ingredients were processed into chocolate cake in a conventional manner, and it was found that the product had no difference in taste and touch to the palate from the conventional chocolate-rich cakes.

The common feature of confectionery using cocoa powder produced by the present invention is a relatively strong cocoa flavor. This demonstrates that a cocoa flavor is mostly contained in outer shells rather than the flesh. In addition, each product has no harshness to the palate irrespective of the hard tissues in the shells. This demonstrates that the tissues in the shells were sufficiently pulverized after being frozen at not higher than −50 degrees C., which constitutes a unique aspect of the present invention. A further reason for the relatively strong cocoa flavor is derived from the fact that the pulverization almost instantly took place at a freezing temperature before the flavoring ingredients are lost in becoming oxidized or in chemically reacting with other substances.

The cocoa powder produced by the present invention can be mixed with cocoa powder, either in its natural state or processed (e.g., sweetened or milked) state, currently available in the market.

What is claimed is:

1. A process for manufacturing cocoa powder using cocoa shells comprising the steps of:
   a. separating the cocoa shells from cocoa beans;
   b. extracting astringency from said cocoa shells;
   c. freezing said cocoa shells in liquid nitrogen;
   d. pulverizing said frozen cocoa shells at a temperature not greater than −30° C.; and
   e. recovering the extracted, frozen and pulverized cocoa shells for use as a cocoa powder.

2. A process as set forth in claim 1, wherein the astringency extraction comprises adding alcohol to said cocoa shells, blending said cocoa shells in said alcohol, and allowing said cocoa shells to mature at a temperature of 20 degrees C. to 80 degrees C.

3. A process as set forth in claim 1, wherein the astringency extraction comprises adding a skim milk solution to said cocoa shells, blending said cocoa shells in said skim milk solution, and allowing said cocoa shells to mature at a temperature of 20° C. to 80° C.

4. A process as set forth in claim 1, wherein the pulverization takes place under an inert atmosphere of nitrogen of not higher than −50 degrees C.

5. A process as set forth in claim 1, wherein the pulverization takes place under an atmosphere of carbon dioxide of not higher than −30 degrees C.

6. A process for the manufacture of cocoa powder using cocoa shells comprising the steps of:
   a. separating the cocoa shells from cocoa beans;
   b. freezing said cocoa shells in liquid nitrogen;
   c. pulverizing said frozen cocoa shells at a temperature no greater than −30° C.
   d. extracting astringency from said pulverized shells; and e. recovering the frozen, pulverized and extracted cocoa shells for use as a cocoa powder.

7. A process as set forth in claim 6, wherein the astringency extraction comprises adding alcohol to said pulverized shells, blending said pulverized shells in said alcohol, and allowing said pulverized shells to mature at a temperature of 20 degrees C. to 80 degrees C.

8. A process as set forth in claim 6, wherein the astringency extraction comprises adding a skim milk solution to said pulverized shells, blending said pulverized shells in said skim milk solution, and allowing said pulverized shells to mature at a temperature of 20° C. to 80° C.

9. A process as set forth in claim 6, wherein the pulverization takes place under an inert atmosphere of nitrogen of not higher than −50 degrees C.

10. A process as set forth in claim 6, wherein the pulverization takes place under an atmosphere of carbon dioxide of not higher than −30 degrees C.

11. A process as set forth in claims 1 or 6 wherein said shells include embryo buds.

12. The process of claim 1 or 6 wherein said freezing of said cocoa shells comprises submerging said cocoa shells in liquid nitrogen kept at not higher than −196° C., thereby allowing said shells to instantly freeze.

13. The process of claim 1 or 6, wherein said frozen cocoa shells are pulverized in a freezing gaseous atmosphere.

14. A cocoa powder prepared by the process of claim 1 or 6.

15. A process for manufacturing of cocoa powder using unshelled cocoa beans comprising the steps of:
a. extracting astringency from unshelled cocoa beans;
b. extracting fat from said unshelled cocoa beans;
c. freezing said unshelled cocoa beans in liquid nitrogen;
d. pulverizing said unshelled cocoa beans at a temperature not greater than −30° C.; and
e. recovering the extracted, frozen and pulverized unshelled cocoa beans for use as a cocoa powder.

16. A process as set forth in claim 15, wherein the astringency extraction comprises adding alcohol to said cocoa beans, blending said cocoa beans in said alcohol, and allowing said cocoa beans to mature at a temperature of 20 degrees C. to 80 degrees C.

17. A process as set forth in claim 15, wherein the astringency extraction comprises adding a skim milk solution to said cocoa beans, blending said cocoa beans in said skim milk solution, and allowing said cocoa beans to mature at a temperature of 20° C. to 80° C.

18. A process as set forth in claim 15, wherein the pulverization takes place under an inert atmosphere of nitrogen of not higher than −50 degrees C.

19. A process as set forth in claim 15, wherein the pulverization takes place under the atmosphere of carbon dioxide of not higher than −30 degrees C.

20. A process for manufacturing cocoa powder using unshelled cocoa beans comprising the steps of:
a. extracting fat from unshelled cocoa beans;
b. freezing said unshelled cocoa beans in liquid nitrogen;
c. pulverizing said frozen unshelled cocoa beans at a temperature not greater than −30° C.,
d. extracting astringency from said pulverized unshelled cocoa beans; and
e. recovering the frozen, pulverized and extracted unshelled cocoa beans for use as a cocoa powder.

21. A process as set forth in claim 20, wherein the astringency extraction comprises adding alcohol to said pulverized beans, blending said pulverized beans in said alcohol, and allowing said pulverized beans to mature at a temperature of 20 degrees C. to 80 degrees C.

22. A process as set forth in claim 20, wherein the astringency extraction comprises adding a skim milk solution to said pulverized beans, blending said pulverized beans in said skim milk solution, and allowing said pulverized beans to mature at a temperature of 20° C. to 80° C.

23. A process as set forth in claim 20, wherein the pulverization takes place under an inert atmosphere of nitrogen of not higher than −50 degrees C.

24. A process as set forth in claim 20, wherein the pulverization takes place under the atmosphere of carbon dioxide of not higher than −30 degrees C.

25. A process as set forth in claims 15 or 20 wherein said beans include embryo buds.

26. The process of claim 15 or 20 wherein said freezing of said cocoa shells comprises submerging said cocoa shells in liquid nitrogen kept at not higher than −196° C., thereby allowing said shells to instantly freeze.

27. The process of claim 15 or 20, wherein said frozen cocoa shells are pulverized in a freezing gaseous atmosphere.

28. A cocoa powder prepared by the process of claim 15 or 20.

* * * * *